United States Patent
Wang

(10) Patent No.: US 11,244,092 B2
(45) Date of Patent: Feb. 8, 2022

(54) FIRE DEVELOPMENT SITUATION PREDICTION DEVICE AND METHOD

(71) Applicant: Shenzhen Fugui Precision Ind. Co., Ltd., Shenzhen (CN)

(72) Inventor: Shih-Cheng Wang, New Taipei (TW)

(73) Assignee: Shenzhen Fulian Fugui Precision Industry Co., Ltd., Shenzhen (CN)

( * ) Notice: Subject to any disclaimer, the term of this patent is extended or adjusted under 35 U.S.C. 154(b) by 371 days.

(21) Appl. No.: 16/369,052

(22) Filed: Mar. 29, 2019

(65) Prior Publication Data

US 2020/0242202 A1 Jul. 30, 2020

(30) Foreign Application Priority Data

Jan. 29, 2019 (CN) .......................... 201910086844.5

(51) Int. Cl.
*G06F 30/20* (2020.01)
*G06N 20/00* (2019.01)
*G06N 3/08* (2006.01)
*G06F 111/10* (2020.01)

(52) U.S. Cl.
CPC .............. *G06F 30/20* (2020.01); *G06N 3/08* (2013.01); *G06N 20/00* (2019.01); *G06F 2111/10* (2020.01)

(58) Field of Classification Search
CPC ..... G06F 30/20; G06F 2111/10; G06N 20/00; G06N 3/08

USPC ............................................................ 703/6
See application file for complete search history.

(56) References Cited

U.S. PATENT DOCUMENTS

| 2019/0012904 A1* | 1/2019 | Yusuf ................... A62B 17/003 |
| 2020/0159397 A1* | 5/2020 | Tohidi ................. G06F 3/04845 |

FOREIGN PATENT DOCUMENTS

| CN | 101986358 A | 3/2011 |
| CN | 107564231 A | 1/2018 |

OTHER PUBLICATIONS

Hodges_2018 (Predicting Large Domain Multi-Physics Fire Behavior Using Artificial Neural Networks, Nov. 16, 2018) (Year: 2018).*

(Continued)

*Primary Examiner* — Brian S Cook
(74) *Attorney, Agent, or Firm* — ScienBiziP, P.C.

(57) ABSTRACT

A fire development situation prediction method includes collecting simulation data of a fire, establishing a neural network of an engineered deep learning model, training the neural network with the simulation data, determining whether an output value of the neural network is less than or equal to a preset error threshold value, stopping training of the neural network when the output value of the neural network is less than or equal to a preset error threshold value, recollecting the simulation data of the fire when the output value of the neural network is not less than or equal to a preset error threshold value, and evaluating the development situation of the fire according to the engineered deep learning model. The fire development situation prediction method is for predicting a development situation of a fire.

14 Claims, 3 Drawing Sheets

(56) References Cited

OTHER PUBLICATIONS

McGrattan_2000 (Fire Dynamic Simulator—User's Manual, NISTIR 6469 2000) (Year: 2000).*
Celik_2010 (Fast and Efficient Method for Fire Detection Using Image Processing, ETRI Journal, vol. 32, No. 6, Dec. 2010). (Year: 2010).*
Jun-Lie Chen; A Study on the Simulation of Temperature Estimation by Field Model on the Performance-Based Design in Fire Spread Prevention; Jul. 2008; 149 Pages.

* cited by examiner

FIRE DEVELOPMENT SITUATION PREDICTION DEVICE AND METHOD

FIELD

The subject matter herein generally relates to power supplies, and more particularly to a power supply for an electronic device.

BACKGROUND

When a fire occurs, the fire needs to be put out as soon as possible. Current fire analysis software analyzes various situations in the event of a fire in a certain area and proposes countermeasures. However, the countermeasures may not be adjustable in real time according to actual data at a fire site.

BRIEF DESCRIPTION OF THE DRAWINGS

Implementations of the present disclosure will now be described, by way of embodiments, with reference to the attached figures.

DETAILED DESCRIPTION

Figure 1:
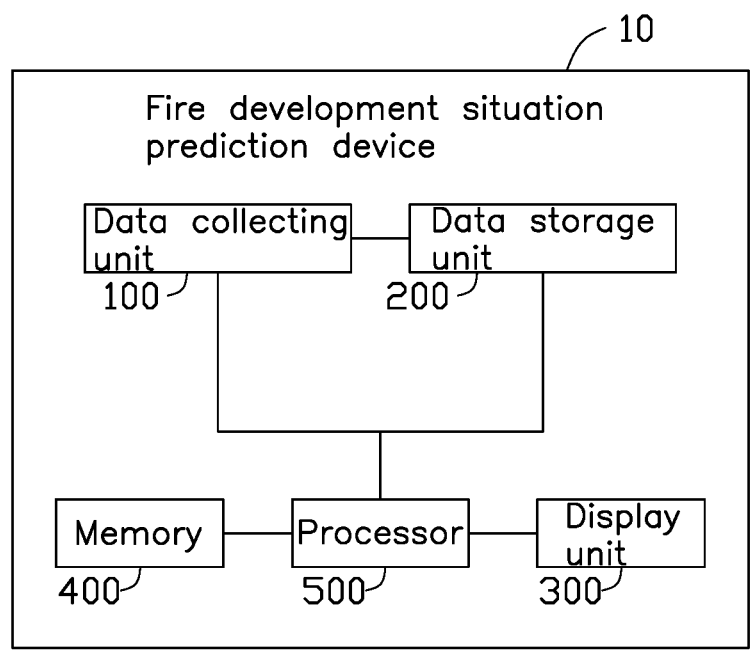
FIG. 1 is a block diagram of a fire development situation prediction device.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of a fire development situation prediction device 10 for predicting the development of a fire. The fire development situation prediction device 10 generates engineering analysis data by numerical simulation, and the obtained engineering analysis data is used as a sample of deep learning to establish an engineered deep learning model applied to fire development situation prediction. Furthermore, the fire development situation prediction device 10 also optimizes the engineered deep learning model by using actual data samples, so that the deep learning model includes actual environmental features and establishes a hybrid deep learning model.

Specifically, the fire development situation prediction device 10 includes a data collecting unit 100, a data storage unit 200, a display unit 300, a processor 500, and a memory 400. The data collecting unit 100, the data storage unit 200, the display unit 300, and the memory 400 are electrically coupled to the processor 500.

The data storage unit 200 is configured to store simulation data of a fire. The simulation data is the engineering analysis data generated by a data simulation software, and the simulation data is used as a data sample for training the engineered deep learning model. The obtained engineered deep learning model can accurately predict a fire development situation.

The simulation data is obtained by collecting boundary condition data of a pre-analysis area. The boundary condition data may include, but is not limited to, a geometry of the pre-analysis area, a position and size of doors and windows, a material of objects, a type and position of a detector, and a heat release rate and position of a fire source.

The data collecting unit 100 is configured to collect actual data of a fire. The actual data of the fire is feature data collected by various safety, fire, environmental, and other equipment, including but not limited to, temperature, humidity, harmful gas concentration, and gas pressure. The actual data is used to optimize the engineered deep learning model to obtain the hybrid deep learning model.

The data storage unit 200 is also configured to store the actual data of the fire described above as sample data for training the hybrid deep learning model. The hybrid deep learning model obtained from using the actual data is applied to achieve more accurate fire development situation prediction.

The memory 400 is configured to store various types of data in the fire development situation prediction device 10, such as program codes for processing data and the like to realize high-speed, automatic completion of access of programs or data during the operation of the fire development situation prediction device 10.

The memory 400 also stores a feature data conversion rule. The feature data conversion rule simulates feature data of the fire according to the boundary condition data of the pre-analysis area. The feature data includes temperature, humidity, harmful gas concentration, gas pressure, and the like. According to the feature data of the fire, a corresponding detection rate of each detector is obtained. The detection rate represents a development amount of a fire. The detection rate is converted into a proportion value according to a value of the detection rate. The proportion value is in the range of 0-1. Specific conversion data is detailed below.

The memory 400 also stores a decision scheme that combines the detection rates of each detector. The decision scheme includes one or more of rescue operations, perimeter protection, fire containment, fire extinguishment, ventilation and smoke exhaust, financial maintenance, and residual fire treatment. It should be understood that rescue operations and fire extinguishment are generally required decision schemes, and other decision schemes are based on actual conditions of the fire.

The memory 400 may be, but is not limited to, a read-only memory (ROM), a random access memory (RAM), a programmable read-only memory (PROM), an Erasable Programmable Read-Only Memory (EPROM), a One-Time Programmable Read-Only Memory (OTPROM), Electronically-Erasable Programmable Read-Only Memory (EEPROM), Compact Disc Read-Only Memory (CD-ROM), or other optical disc storage, magnetic tape storage, or any other medium readable by a computer that can be used to carry or store data.

The processor 500 may be a digital signal processor (DSP), a microcontroller unit (MCU), an Advanced RISC Machine (ARM), a field-programmable gate array (FPGA), a Central Processing Unit (CPU), a System on a Chip (SoC), or other equivalent dedicated chip.

The display unit 300 is configured to display a processing result of the processor 500, such as displaying the above decision scheme. In one embodiment, the display unit 300 may be, but is not limited to, a display device such as a touch display screen or a liquid crystal display.

Figure 2:
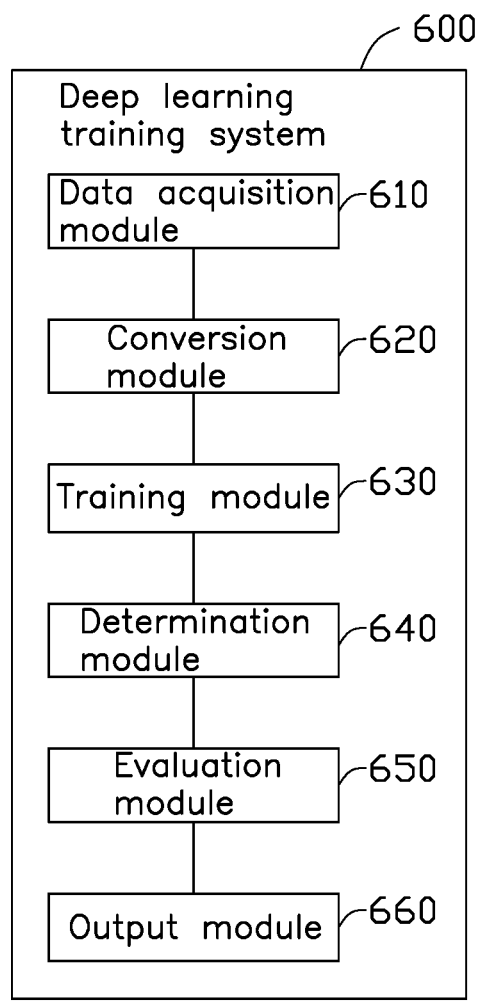
FIG. 2 is a block diagram of a deep learning training system implemented in the fire development situation prediction device in FIG. 1.

Referring to FIG. 2, the fire development situation prediction device 10 includes a deep learning training system 600. The deep learning training system 600 includes one or more computer instructions in the form of function modules stored in the memory 400 and executed by the processor 500. Specifically, the deep learning training system 600 includes a data acquisition module 610, a conversion module 620, a training module 630, a determination module 640, an evaluation module 650, and an output module 660.

The data acquisition module 610 is configured to acquire simulation data and actual data of a fire. The simulation data is used for deep learning training to obtain the engineered deep learning model. Furthermore, the engineered deep learning model is optimized by using the actual data to obtain a hybrid deep learning model.

The conversion module 620 is configured to convert the feature data into a proportion value of the detection rate. Specifically, the simulation data simulates the feature data of the fire according to the boundary condition data of the pre-analysis area. The boundary condition data may include, but is not limited to, a geometry of the pre-analysis area, a position and size of doors and windows, a material of objects, a type and position of a detector, and a heat release rate and position of a fire source. The feature data includes temperature, humidity, harmful gas concentration, gas pressure, and the like. The actual data of the fire is the feature data collected by various safety, fire, environmental, and other equipment, including but not limited to, temperature, humidity, harmful gas concentration, and gas pressure.

The simulation data is obtained by detectors S1, S2, S3, S4, S5, and S6 simulating fire conditions of different fire sources in the pre-analysis area, and the detection rate of each detector is obtained at 4 seconds (s), 9 s, 24 s, 32 s, and 60 s as shown below in Table 1.

TABLE 1

Detection rate (%) of each detector at different times

| T | Detector | | | | | |
|---|---|---|---|---|---|---|
| | S1 | S2 | S3 | S4 | S5 | S6 |
| 4 s | 2.14 | 6.99 | 2.34 | 0 | 0 | 0 |
| 9 s | 20.72 | 55.39 | 20.37 | 0 | 0 | 0 |
| 24 s | 41.04 | 63.53 | 42.47 | 13.21 | 7.65 | 0.36 |
| 32 s | 45.06 | 67.76 | 45.05 | 20.13 | 15.08 | 10.68 |
| 60 s | 54.37 | 71.01 | 54.14 | 29.55 | 29.18 | 24.05 |

After obtaining the detection rate of each detector in the above Table 1 at different times, the detection rate is converted into the proportion value as shown in Table 2.

TABLE 2

Proportion value of detection rate of each detector

| T | Detector | | | | | |
|---|---|---|---|---|---|---|
| | S1 | S2 | S3 | S4 | S5 | S6 |
| 4 s | 0.02 | 0.07 | 0.02 | 0.00 | 0.00 | 0.00 |
| 9 s | 0.21 | 0.55 | 0.20 | 0.00 | 0.00 | 0.00 |
| 24 s | 0.41 | 0.64 | 0.42 | 0.13 | 0.08 | 0.00 |
| 32 s | 0.45 | 0.68 | 0.45 | 0.20 | 0.15 | 0.11 |
| 60 s | 0.54 | 0.71 | 0.54 | 030 | 0.29 | 0.24 |

The engineered deep learning model is trained using the proportion value of the detection rate in Table 2.

Similarly, the detection rate of each detector obtaining the actual feature data is converted into the proportion value to optimize the engineered deep learning model, thereby obtaining a hybrid deep learning model.

The training module 630 is configured to train the engineered deep learning model and the hybrid class deep learning model. Specifically, a neural network in the engineered deep learning model for predicting a fire development situation is established, the neural network model is trained by using the proportion value of the detection rates obtained by the simulation data, and parameter fine-tuning is manually performed (such as fine-tuning a number of hidden layers and a learning rate) to obtain the engineered deep learning model.

The training module 630 is further configured to optimize the engineered deep learning model by using the proportion value of the detection rates of the actual data to obtain the hybrid deep learning model.

The determination module 640 is configured to determine whether an output value of the neural network is less than or equal to a preset error threshold value. In one embodiment, the preset error threshold value is 5%. The preset error threshold value represents a convergence condition. When the convergence condition is reached, the neural network stops training. If the output value of the neural network is less than or equal to the preset error threshold value, the training of the neural network is stopped, and the engineered deep learning model is completed. If the output value of the neural network is greater than the preset error threshold value, the neural network is retrained.

The evaluation module 650 is configured to evaluate the development of the fire according to the engineered deep learning model or the hybrid deep learning model. When a detector at the site of the fire issues an alarm, the detector continuously obtains the detection rate data, and the detection rate data is continuously input into the engineered deep learning model or the hybrid deep learning model. The decision scheme is provided according to an environmental change at the site of the fire.

The decision scheme includes one or more of rescue operations, perimeter protection, fire containment, fire extinguishment, ventilation and smoke exhaust, financial maintenance, and residual fire treatment.

The output module 660 is configured to output the decision scheme for management personnel or rescue personnel to understand the development situation of the fire in order to quickly and accurately make a rescue plan.

Figure 3:
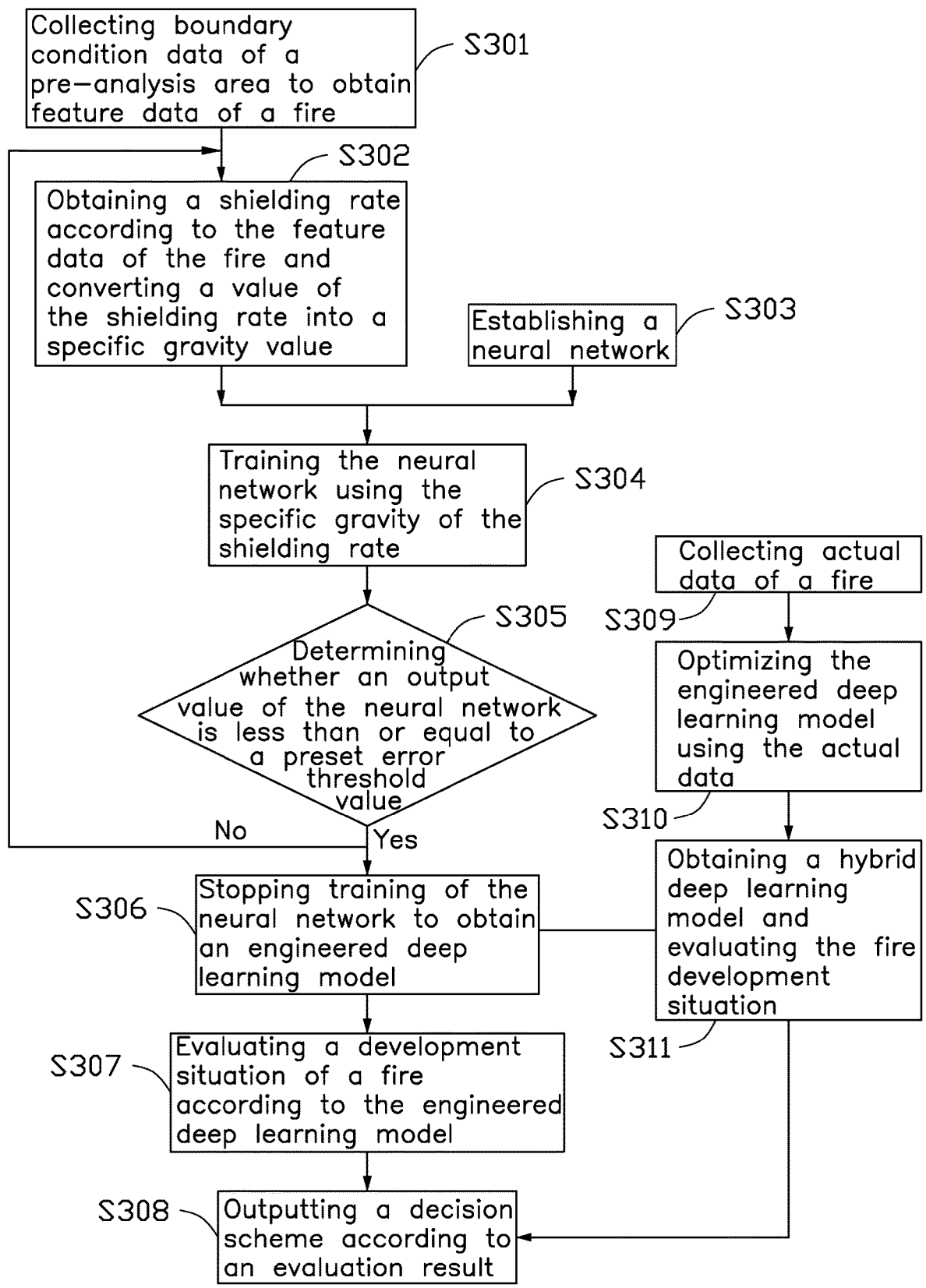
FIG. 3 is a flowchart of a fire development situation prediction method.

FIG. 3 shows a fire development situation prediction method for predicting a fire development situation.

At block S301, boundary condition data of a pre-analysis area is collected to obtain feature data of a fire.

Specifically, the boundary condition data of the pre-analysis area is collected for collecting simulation data, and the boundary condition data of the pre-analysis area is stored in the data storage unit 200. The simulation data is engineering analysis data generated by data simulation software. The boundary condition data may include, but is not limited to, a geometry of the pre-analysis area, a position and size of doors and windows, a material of objects, a type and position of a detector, and a heat release rate and position of a fire source.

Furthermore, feature data of the fire such as temperature, humidity, harmful gas concentration, and gas pressure, is simulated according to the boundary condition data of the pre-analysis area.

At block S302, a detection rate is obtained according to the feature data of the fire, and a value of the detection rate is converted into a proportion value of the detection rate.

Specifically, the memory 400 stores a conversion rule. The processor 500 obtains a detection rate corresponding to each detector according to the feature data of the fire according to the conversion rule and converts the detection rate into a proportion value according to a value of the detection rate. The value is between 0-1.

The simulation data is obtained by detectors S1, S2, S3, S4, S5, and S6 simulating fire conditions of different fire sources in the pre-analysis area, and the detection rate of each detector is obtained at 4 seconds (s), 9 s, 24 s, 32 s, and 60 s as shown below in Table 1.

TABLE 1

Detection rate (%) of each detector at different times

| T | Detector | | | | | |
|---|---|---|---|---|---|---|
| | S1 | S2 | S3 | S4 | S5 | S6 |
| 4 s | 2.14 | 6.99 | 2.34 | 0 | 0 | 0 |
| 9 s | 20.72 | 55.39 | 20.37 | 0 | 0 | 0 |
| 24 s | 41.04 | 63.53 | 42.47 | 13.21 | 7.65 | 0.36 |
| 32 s | 45.06 | 67.76 | 45.05 | 20.13 | 15.08 | 10.68 |
| 60 s | 54.37 | 71.01 | 54.14 | 29.55 | 29.18 | 24.05 |

After obtaining the detection rate of each detector in the above Table 1 at different times, the detection rate is converted into the proportion value as shown in Table 2.

TABLE 2

Proportion value of detection rate of each detector

| T | Detector | | | | | |
|---|---|---|---|---|---|---|
| | S1 | S2 | S3 | S4 | S5 | S6 |
| 4 s | 0.02 | 0.07 | 0.02 | 0.00 | 0.00 | 0.00 |
| 9 s | 0.21 | 0.55 | 0.20 | 0.00 | 0.00 | 0.00 |
| 24 s | 0.41 | 0.64 | 0.42 | 0.13 | 0.08 | 0.00 |
| 32 s | 0.45 | 0.68 | 0.45 | 0.20 | 0.15 | 0.11 |
| 60 s | 0.54 | 0.71 | 0.54 | 030 | 0.29 | 0.24 |

At block S303, a neural network is established.

The processor 500 processes a neural network into an engineered deep learning model for predicting fire development.

At block S304, the neural network is trained using the proportion value of the detection rate.

The neural network is trained using the proportion values of the detection rates obtained in Table 4 above. During the training process, parameter fine-tuning is manually performed (such as fine-tuning a number of hidden layers and a learning rate) to obtain the engineered deep learning model.

At block S305, whether an output value of the neural network is less than or equal to a preset error threshold value is determined.

Specifically, the preset error threshold value is 5%. The preset error threshold value is used as a convergence condition. After the processor 500 determines that the output value of the neural network reaches the convergence condition, the neural network stops training.

If the output value of the neural network reaches the convergence condition, block S306 is implemented. If the output value of the neural network does not reach the convergence condition, block S301 is implemented.

At block S306, the neural network stops training, and the engineered deep learning model is completed.

When the output value of the neural network is less than or equal to the preset error threshold value, the neural network is capable of predicting the development situation of the fire.

When the output value of the neural network is greater than the preset error threshold value, the neural network is not capable of predicting the development situation of the fire, and so the neural network is continued to train.

At block S307, an engineered deep learning model is used to evaluate the development trend of the fire.

When a detector at the site of a fire issues an alarm, the detector continuously obtains the detection rate data, and the detection rate data is continuously input into the engineered deep learning model or the hybrid deep learning model. The decision scheme is provided according to an environmental change at the site of the fire.

At block S308, a decision scheme is output according to the evaluation result.

The display unit 300 displays the decision scheme. The decision scheme includes one or more of rescue operations, perimeter protection, fire containment, fire extinguishment, ventilation and smoke exhaust, financial maintenance, and residual fire treatment. It should be understood that rescue operations and fire extinguishment are generally required decision schemes, and other decision schemes are based on actual conditions of the fire.

The fire development situation prediction method uses the simulation data obtained by the data simulation software to train the neural network, and obtains an engineered deep learning model applied to the fire development situation prediction. The engineered deep learning model is used to evaluate the development situation of the fire, and the decision scheme is output according to the evaluation results. The fire development situation prediction method effectively solves the problem that some sites cannot be deeply studied due to data acquisition difficulties. Therefore, managers or rescuers can quickly and accurately develop effective rescue plans based on decision schemes.

With continued reference to FIG. 3, at block S309, actual data of the fire is collected.

The data collecting unit 100 collects actual data of the fire. The actual data of the fire is feature data collected by various safety, fire, environmental, and other equipment, including but not limited to, temperature, humidity, harmful gas concentration, and gas pressure. The actual data is used to optimize the engineered deep learning model to obtain the hybrid deep learning model.

At block S310, the engineered deep learning model is optimized using the actual data.

The detection rate of each detector obtaining the actual feature data is converted into the proportion value to optimize the engineered deep learning model, thereby obtaining a hybrid deep learning model.

At block S311, a hybrid deep learning model is obtained, and the fire development situation is evaluated.

The hybrid deep learning model is used to assess the development situation of the fire. The hybrid deep learning model contains the actual feature data, which can predict the development of the fire more objectively and accurately.

Again at block S308, the decision scheme is output according to the evaluation result.

The display unit 300 displays the output decision scheme for the management personnel or rescuers to understand the development situation of the fire and make adjustments to the rescue plan according to the actual situation.

The engineered deep learning model is optimized by using the actual data at the fire site to obtain a hybrid deep learning model. The hybrid deep learning model obtained by using actual data is applied to the fire development situation prediction and has more objective and accurate prediction ability.

The fire development situation prediction method and device as described in the above embodiments obtain an engineered deep learning model and a hybrid deep learning model through deep learning, and are used for predicting the development trend of a fire. The fire development situation prediction method and device can realize real-time feedback of actual data at the fire scene and provide management personnel or rescue personnel with auxiliary suggestions according to the decision scheme, thereby allowing a quick and accurate rescue plan to be devised.

It can be understood that the fire development situation prediction method and device can be applied to other situations where actual data is difficult to obtain, such as by environmental monitoring, safety monitoring, and the like. An engineered deep learning model is provided through the integrated application of engineering data and pre-sampling without a large number of actual environmental features.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A fire development situation prediction method for predicting a development situation of a fire, the method comprising:
    collecting boundary condition data of a pre-analysis area;
    obtaining feature data of the fire through simulation analysis according to the boundary condition data;
    obtaining a detection rate of each detector according to the feature data;
    converting the detection rate of each detector into a proportion value according to a value of the detection rate;
    collecting simulation data of a fire;
    establishing a neural network of an engineered deep learning model for predicting a fire development situation;
    training the neural network with the simulation data;
    determining whether an output value of the neural network is less than or equal to a preset error threshold value;
    stopping training of the neural network and completing the engineered deep learning model when the output value of the neural network is less than or equal to a preset error threshold value;
    recollecting the simulation data of the fire when the output value of the neural network is not less than or equal to a preset error threshold value until the output value of the neural network is less than or equal to the preset error threshold value; and
    evaluating the development situation of the fire by applying the engineered deep learning model and outputting a decision scheme according to an evaluation result;
    continuously obtaining a detection rate according to a smoke detector; and continuously inputting the detection rate to the engineered deep learning model.

2. The fire development situation prediction method of claim 1, wherein the boundary condition data comprising a geometry of the pre-analysis area, a position and size of doors and windows, a material of objects, a type and position of at least one detector, and a heat release rate and position of a fire source; and
    the feature data comprising temperature, humidity, harmful gas concentration, and gas pressure, the feature data obtained by the at least one detector.

3. The fire development situation prediction method of claim 2, wherein the proportion value being in a range of 0-1.

4. The fire development situation prediction method of claim 3, wherein evaluating the development situation of the fire according to the engineered deep learning model and outputting a decision scheme according to an evaluation result further comprises:
    outputting the decision scheme and displaying the decision scheme, the decision scheme comprising at least one of rescue operations, perimeter protection, fire containment, fire extinguishment, ventilation and smoke exhaust, financial maintenance, and residual fire treatment.

5. The fire development situation prediction method of claim 4, wherein after the engineered deep learning model is completed, the method further comprises:
    collecting actual data of a fire;
    optimizing the engineered deep learning model according to the actual data;

obtaining a hybrid deep learning model to evaluate a development status of the fire and outputting the decision scheme according to an evaluation result.

6. A fire development situation prediction device for predicting a development situation of a fire, the fire development situation prediction device comprising:
a data storage unit configured to store simulation data of a fire;
a processor; and
a memory configured to store a plurality of instructions, which when executed by the processor, cause the processor to:
collect boundary condition data of a pre-analysis area;
obtain feature data of the fire through simulation analysis according to the boundary condition data;
obtain a detection rate of each detector according to the feature data;
convert the detection rate of each detector into a proportion value according to a value of the detection rate;
collect simulation data of a fire;
establish a neural network of an engineered deep learning model for predicting a fire development situation;
train the neural network with the simulation data;
determine whether an output value of the neural network is less than or equal to a preset error threshold value;
stop training of the neural network and complete the engineered deep learning model when the output value of the neural network is less than or equal to a preset error threshold value;
recollect the simulation data of the fire when the output value of the neural network is not less than or equal to a preset error threshold value until the output value of the neural network is less than or equal to the preset error threshold value; and
evaluate the development situation of the fire according to the engineered deep learning model and output a decision scheme according to an evaluation result
continuously obtain a detection rate according to a smoke detector; and
continuously input the detection rate to the engineered deep learning model.

7. The fire development situation prediction device of claim 6, wherein the boundary condition data comprising a geometry of the pre-analysis area, a position and size of doors and windows, a material of objects, a type and position of a detector, and a heat release rate and position of a fire source; and
the feature data comprising temperature, humidity, harmful gas concentration, and gas pressure, the feature data obtained by at least one detector;
the proportion value being in the range of 0-1.

8. The fire development situation prediction device of claim 7 further comprising a display unit, wherein the processor evaluates the development situation of the fire according to the engineered deep learning model and outputs the decision scheme according to an evaluation result by:
outputting the decision scheme and displaying the decision scheme on the display unit, the decision scheme comprising at least one of rescue operations, perimeter protection, fire containment, fire extinguishment, ventilation and smoke exhaust, financial maintenance, and residual fire treatment.

9. The fire development situation prediction device of claim 8, wherein after the engineered deep learning model is completed, the processor is further configured to:
collect actual data of a fire;
optimize the engineered deep learning model according to the actual data;
obtain a hybrid deep learning model to evaluate a development status of the fire and output the decision scheme according to an evaluation result.

10. A non-transitory storage medium having stored thereon instructions that, when executed by a processor of a fire development situation prediction device, causes the processor to execute instructions of a fire development situation prediction method, the method comprising:
collecting boundary condition data of a pre-analysis area;
obtaining feature data of the fire through simulation analysis according to the boundary condition data;
obtaining a detection rate of each detector according to the feature data;
converting the detection rate of each detector into a proportion value according to a value of the detection rate;
collecting simulation data of a fire;
establishing a neural network of an engineered deep learning model for predicting a fire development situation;
training the neural network with the simulation data;
determining whether an output value of the neural network is less than or equal to a preset error threshold value;
stopping training of the neural network and completing the engineered deep learning model when the output value of the neural network is less than or equal to a preset error threshold value;
recollecting the simulation data of the fire when the output value of the neural network is not less than or equal to a preset error threshold value until the output value of the neural network is less than or equal to the preset error threshold value; and
evaluating the development situation of the fire according to the engineered deep learning model and outputting a decision scheme according to an evaluation result continuously obtaining a detection rate according to a smoke detector; and
continuously inputting the detection rate to the engineered deep learning model.

11. The non-transitory storage medium of claim 10, wherein the boundary condition data comprising a geometry of the pre-analysis area, a position and size of doors and windows, a material of objects, a type and position of a detector, and a heat release rate and position of a fire source; and
the feature data comprising temperature, humidity, harmful gas concentration, and gas pressure, the feature data obtained by at least one detector.

12. The non-transitory storage medium of claim 11, wherein the proportion value being in the range of 0-1.

13. The non-transitory storage medium of claim 12, wherein evaluating the development situation of the fire according to the engineered deep learning model and outputting a decision scheme according to an evaluation result comprises:
outputting the decision scheme and displaying the decision scheme, the decision scheme comprising at least one of rescue operations, perimeter protection, fire containment, fire extinguishment, ventilation and smoke exhaust, financial maintenance, and residual fire treatment.

14. The non-transitory storage medium of claim 13, wherein after the engineered deep learning model is completed, the method further comprises:
collecting actual data of a fire;
optimizing the engineered deep learning model according to the actual data;
obtaining a hybrid deep learning model to evaluate a development status of the fire and outputting the decision scheme according to an evaluation result.

* * * * *